(12) United States Patent
Mullen et al.

(10) Patent No.: US 11,247,540 B2
(45) Date of Patent: Feb. 15, 2022

(54) VEHICLE TRIM PANEL INTERLOCK FOR LIMITING TRIM PANEL SEPARATION DURING AN IMPACT CONDITION

(71) Applicant: Ford Global Technologies, LLC, Dearborn, MI (US)

(72) Inventors: Gary Mullen, Plymouth, MI (US); Bhavani Thota, Novi, MI (US); Daniel Morin, Southgate, MI (US); Juergen Koehler, Cologne (DE); Linh Doan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 16/814,161

(22) Filed: Mar. 10, 2020

(65) Prior Publication Data

US 2020/0207191 A1   Jul. 2, 2020

Related U.S. Application Data

(63) Continuation of application No. 15/970,276, filed on May 3, 2018, now Pat. No. 10,625,582.

(51) Int. Cl.
*B60J 5/04* (2006.01)
*B60R 13/02* (2006.01)

(52) U.S. Cl.
CPC ........... *B60J 5/0461* (2013.01); *B60J 5/0426* (2013.01); *B60R 13/0243* (2013.01)

(58) Field of Classification Search
CPC .... B60J 5/0426; B60J 5/0461; B60R 13/0243
See application file for complete search history.

(56) References Cited

U.S. PATENT DOCUMENTS

| | | | |
|---|---|---|---|
| 6,837,005 B2 | 1/2005 | Arata et al. | |
| 6,991,279 B2 | 1/2006 | Sweers et al. | |
| 7,490,851 B2 | 2/2009 | Riester et al. | |
| 7,500,712 B2 | 3/2009 | Hirooka et al. | |
| 7,566,091 B2 | 7/2009 | Yagi | |
| 7,581,779 B2 | 9/2009 | Baumgart et al. | |
| 9,027,982 B2* | 5/2015 | Ide | B60J 10/20 |
| | | | 296/146.2 |
| 2018/0290603 A1* | 10/2018 | Gillay | B60J 5/0413 |

FOREIGN PATENT DOCUMENTS

CN           202923528           5/2013

* cited by examiner

*Primary Examiner* — D Glenn Dayoan
*Assistant Examiner* — Melissa Ann Bonifazi
(74) *Attorney, Agent, or Firm* — David Coppiellie; Price Heneveld LLP

(57) ABSTRACT

A vehicle door includes a first interlock coupled to an inner frame panel. A second interlock coupled to an inner trim panel. The first and second interlocks are separated to define a ready state. During an impact condition, the first and second interlocks selectively engage one another to define an impact state that resists deflection of the inner trim panel away from the inner frame panel.

20 Claims, 11 Drawing Sheets

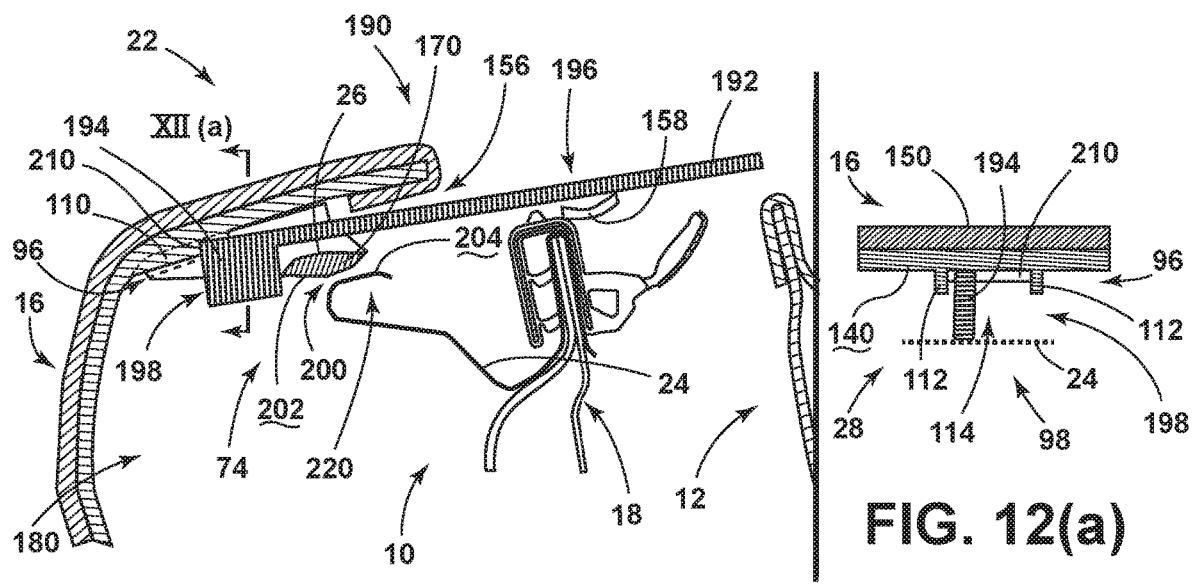
FIG. 12
FIG. 12(a)
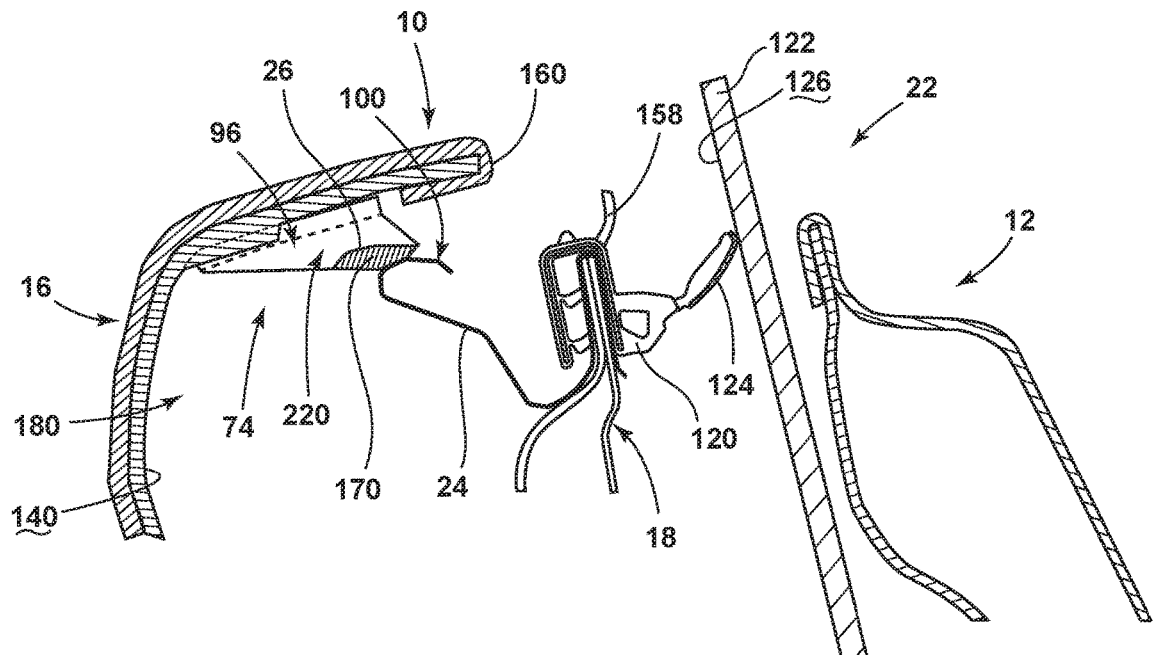
FIG. 13

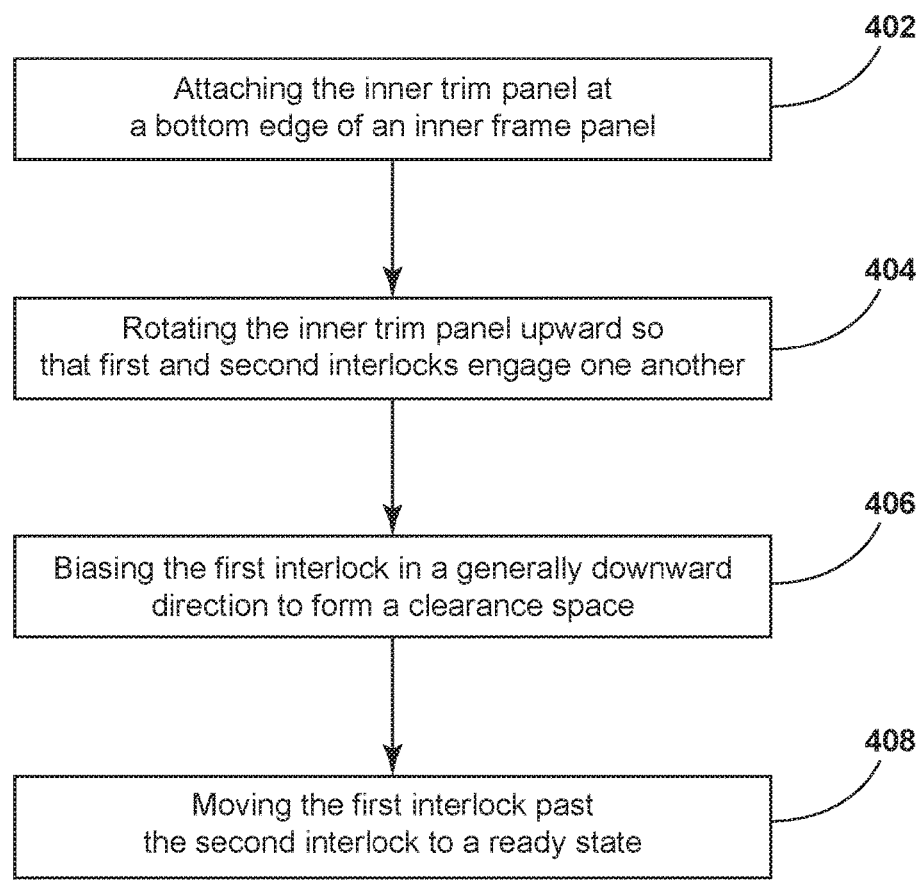

VEHICLE TRIM PANEL INTERLOCK FOR LIMITING TRIM PANEL SEPARATION DURING AN IMPACT CONDITION

CROSS-REFERENCE TO RELATED APPLICATION

The present application is a continuation of U.S. patent application Ser. No. 15/970,276 filed May 3, 2018, entitled VEHICLE TRIM PANEL INTERLOCK FOR LIMITING TRIM PANEL SEPARATION DURING AN IMPACT CONDITION, the entire disclosure of which is hereby incorporated herein by reference.

FIELD OF THE INVENTION

The present invention generally relates to vehicle panels, and more specifically, a trim panel interlock that prevents the trim panel from separating away from a frame member during an impact condition.

BACKGROUND OF THE INVENTION

During manufacture of a vehicle, trim panels are typically attached to frame members for a vehicle frame. These trim panels can be attached through various mechanisms, such as from a bottom edge or from a side edge of the trim panel. Typically, these trim panels are secured to the vehicle frame to prevent separation during an impact condition.

SUMMARY OF THE INVENTION

According to one aspect of the present invention, a vehicle door includes a first interlock coupled to an inner frame panel. A second interlock is coupled to an inner trim panel. The first and second interlocks are separated to define a ready state. During an impact condition, the first and second interlocks selectively engage one another to define an impact state that resists deflection of the inner trim panel away from the inner frame panel.

Embodiments of this aspect of the invention can include any one or combination of the following features:
  the impact condition is further defined by a controlled deflection of the inner trim panel away from the inner frame panel
  a deflection distance of the controlled deflection is substantially similar to a spacing distance defined between the first and second interlocks in the ready state
  the first interlock is positioned between a beltline seal and the inner frame panel, and wherein the first interlock extends toward the inner trim panel
  the first interlock is pre-tensioned in the ready state, wherein the first interlock is biased toward the direction of the impact state
  the inner trim panel includes a biasing member that biases the first interlock into the ready state and defines a pre-tensioned position of the first interlock
  the impact state is defined by the first interlock moving the deflection distance relative to the inner trim panel, wherein the first interlock is removed from the biasing member and is biased into the impact state
  the second interlock includes a locking member that is received within the first interlock in the impact state
  the biasing member of the inner trim panel includes a plurality of ribs
  adjacent ribs of the plurality of ribs define a maintenance access space of the first and second interlocks
  the first and second interlocks are elongated members having cooperative mating structures at respective ends of the first and second interlocks
  the cooperative mating structure of the second interlock is offset from an inner surface of the inner trim panel
  the cooperative mating structures are elongated flanges that are substantially parallel with an upper edge of the inner frame panel According to another aspect of the present invention, a vehicle door includes inner trim and inner frame panels that define a door cavity therebetween. A deflection interlock is disposed within the door cavity and is selectively operable from a ready state to an impact state. The impact state is defined by the deflection interlock securing the inner frame panel to the inner trim panel at a predetermined deflection distance in response to an impact condition.

Embodiments of this aspect of the invention can include any one or combination of the following features:
  the deflection interlock includes a first interlock coupled to the inner frame panel
  the deflection interlock includes a second interlock coupled to the inner trim panel
  the ready state is defined by the first and second interlocks being separated by the predetermined deflection distance, and wherein the impact state is defined by the first and second interlocks being engaged together in an engaged state
  the first interlock is positioned between a beltline seal and the inner frame panel, and wherein the first interlock extends toward the inner trim panel
  the first interlock is pre-tensioned in the ready state and is biased toward the impact state
  the inner trim panel includes a biasing member that biases the first interlock into the ready state and defines a pre-tensioned position of the first interlock
  the biasing member of the inner trim panel includes a plurality of ribs
  adjacent ribs of the plurality of ribs define a maintenance access space of the first and second interlocks
  a mating structure of the second interlock is offset from an inner surface of the inner trim panel According to another aspect of the present invention, a vehicle includes a door having a frame panel and an inner panel. A deflection interlock extends between the frame panel and the interior panel. The deflection interlock is selectively operable from a disconnected ready state to a connected impact state. The connected impact state is defined by the deflection interlock securing the frame panel to the interior panel at a predetermined deflection distance in response to an impact condition.

Embodiments of this aspect of the invention can include any one or combination of the following features:
  the deflection interlock includes a first interlock coupled to the frame panel
  the deflection interlock includes a second interlock coupled to the interior panel
  the ready state is defined by the first and second interlocks being separated by the predetermined deflection distance
  the impact state is defined by the first and second interlocks being engaged together These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 10(a) is a cross-sectional view of the deflection interlock of FIG. 10 taken along line X(a)-X(a);

FIG. 11(a) is a cross-sectional view of the deflection interlock of FIG. 11 taken along XI(a)-XI(a);

FIG. 12 is a cross-sectional view of the deflection interlock of FIG. 11 and showing a next step in the maintenance process;

FIG. 12(a) is a cross-sectional view of the deflection interlock of FIG. 12 taken along line XII(a)-XII(a);

FIG. 13 is a cross-sectional view of the deflection interlock of FIG. 4 showing installation of the trim panel into the ready position;

FIG. 17 is a linear flow diagram illustrating a method for installing an inner trim panel of a vehicle door.

DETAILED DESCRIPTION OF THE PREFERRED EMBODIMENTS

Figure 1:
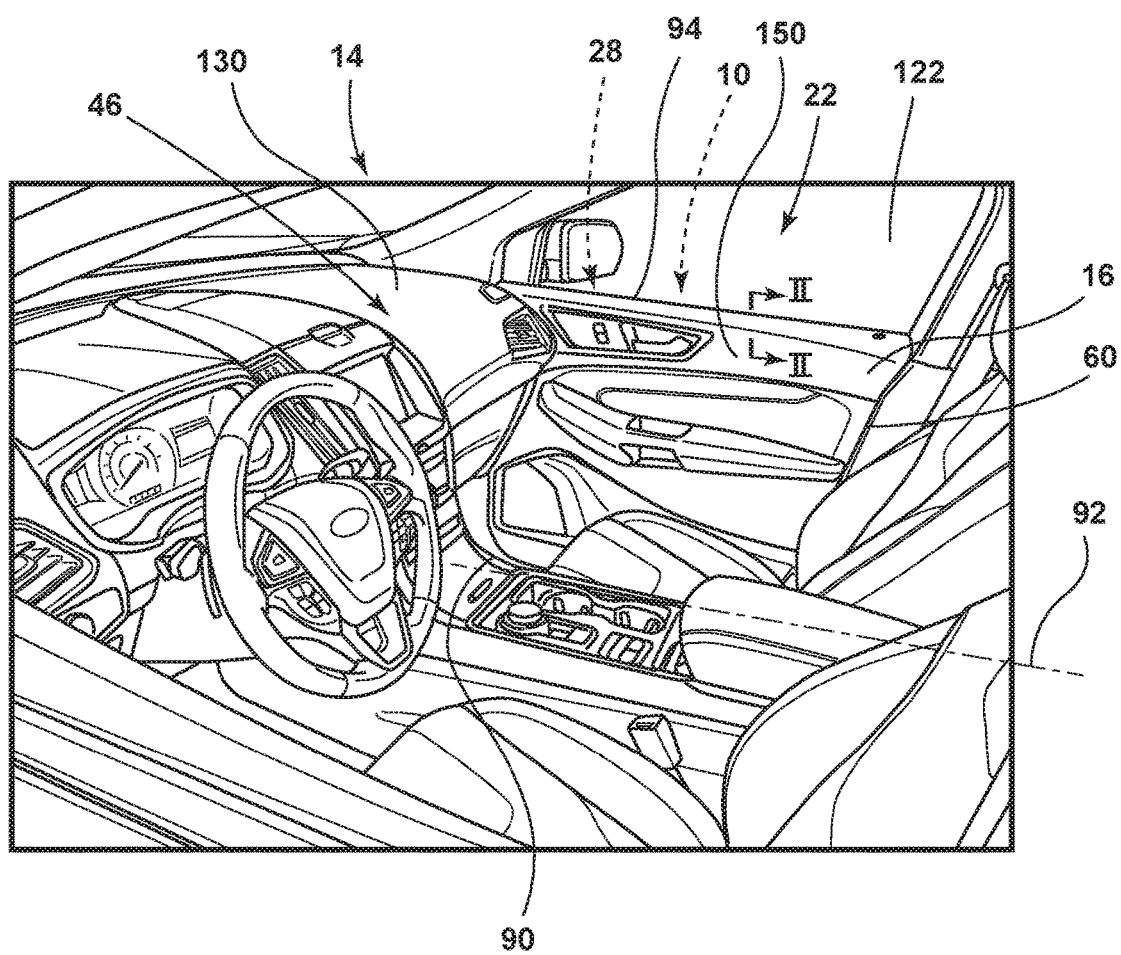
FIG. 1 is a side perspective view of a passenger cabin for a vehicle and showing an aspect of the trim panel for a vehicle door.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
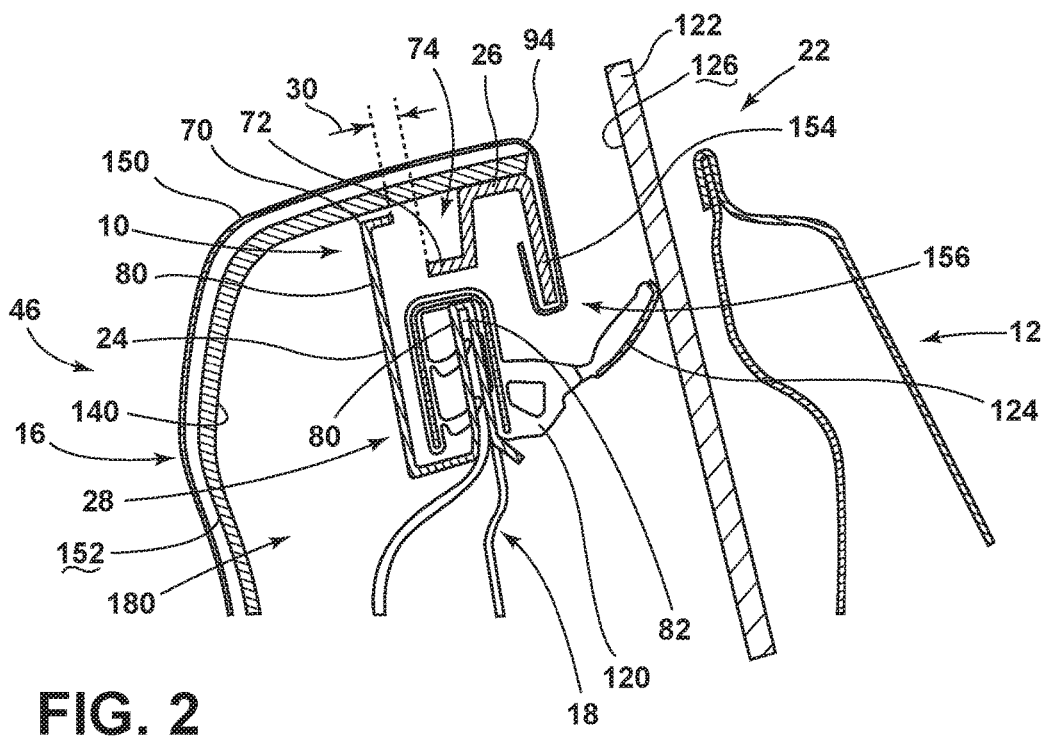
FIG. 2 is a cross-sectional view of the vehicle door of FIG. 1 taken along line II-II, and showing an aspect of the deflection interlock in a ready state.
Figure 3:
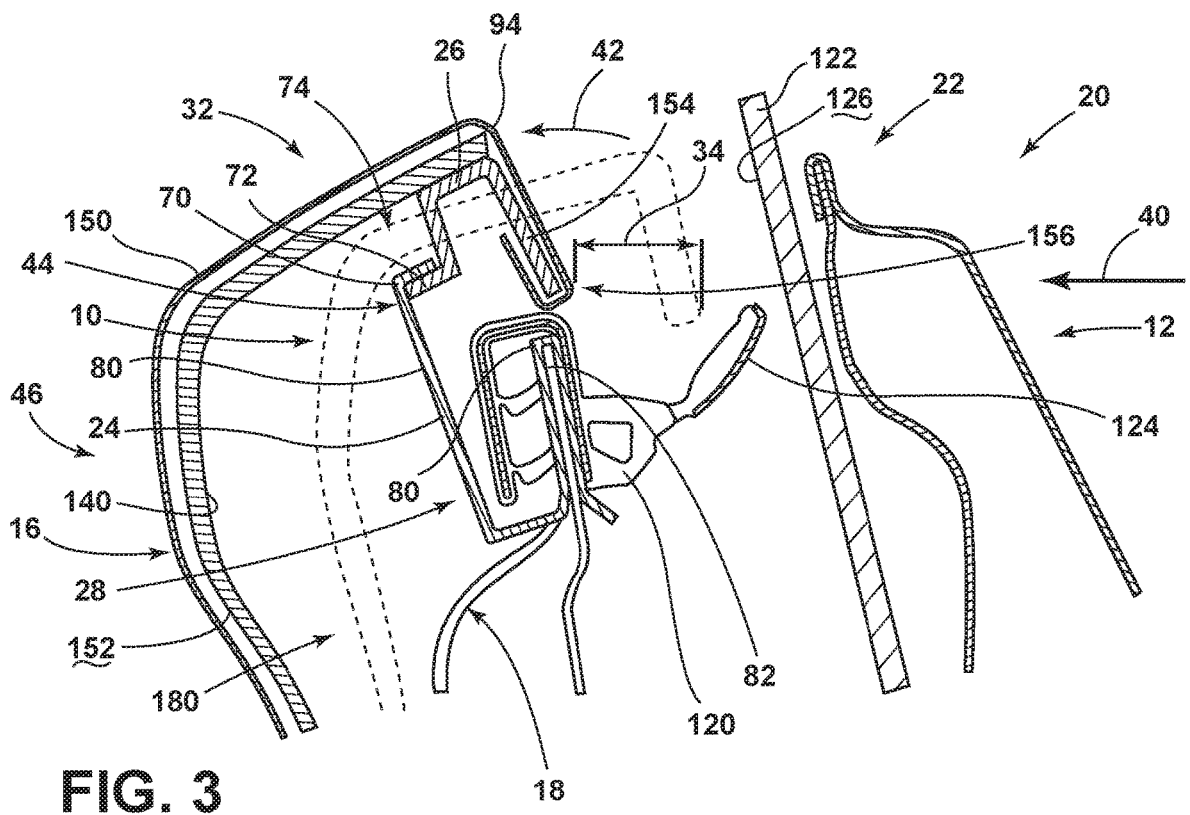
FIG. 3 is a cross-sectional view of the deflection interlock of FIG. 2 and showing the interlock in an impact state.
Figure 4:
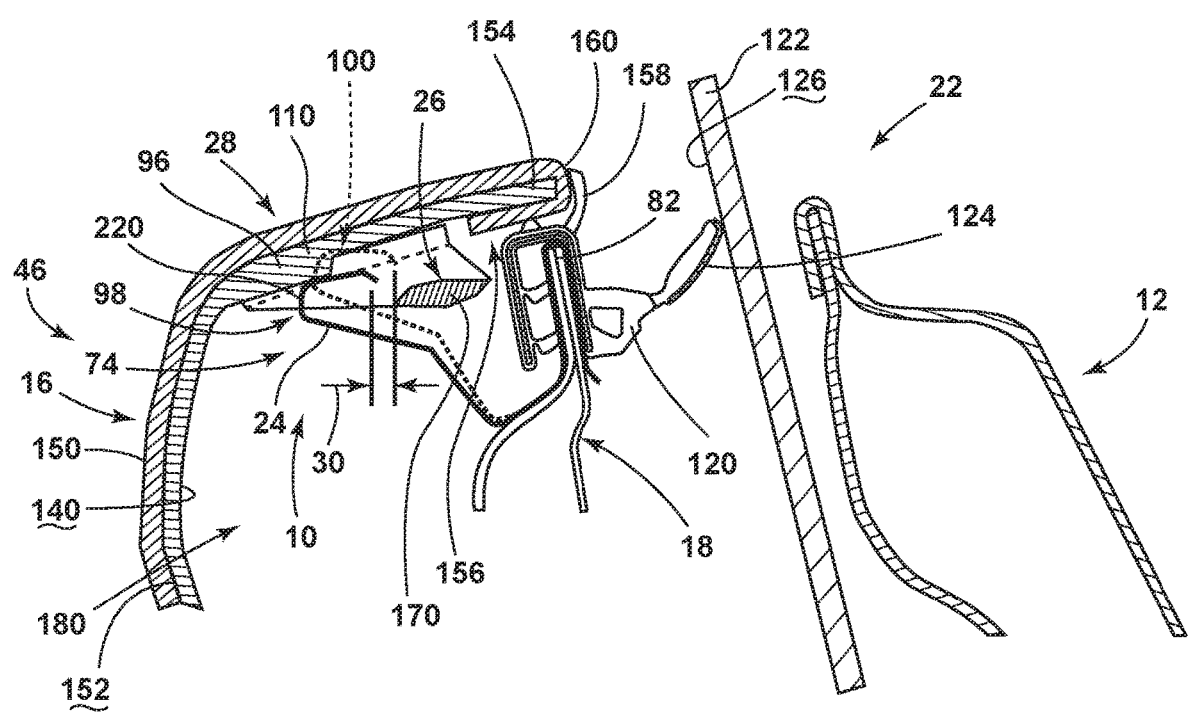
FIG. 4 is an aspect of the deflection interlock for the vehicle of FIG. 1 and showing the deflection interlock in a ready state.
Figure 5:
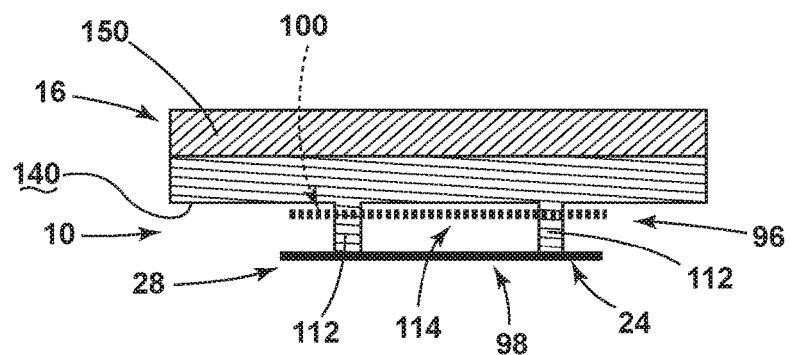
FIG. 5 is a schematic cross-sectional view of the deflection interlock of FIG. 4.
Figure 6:
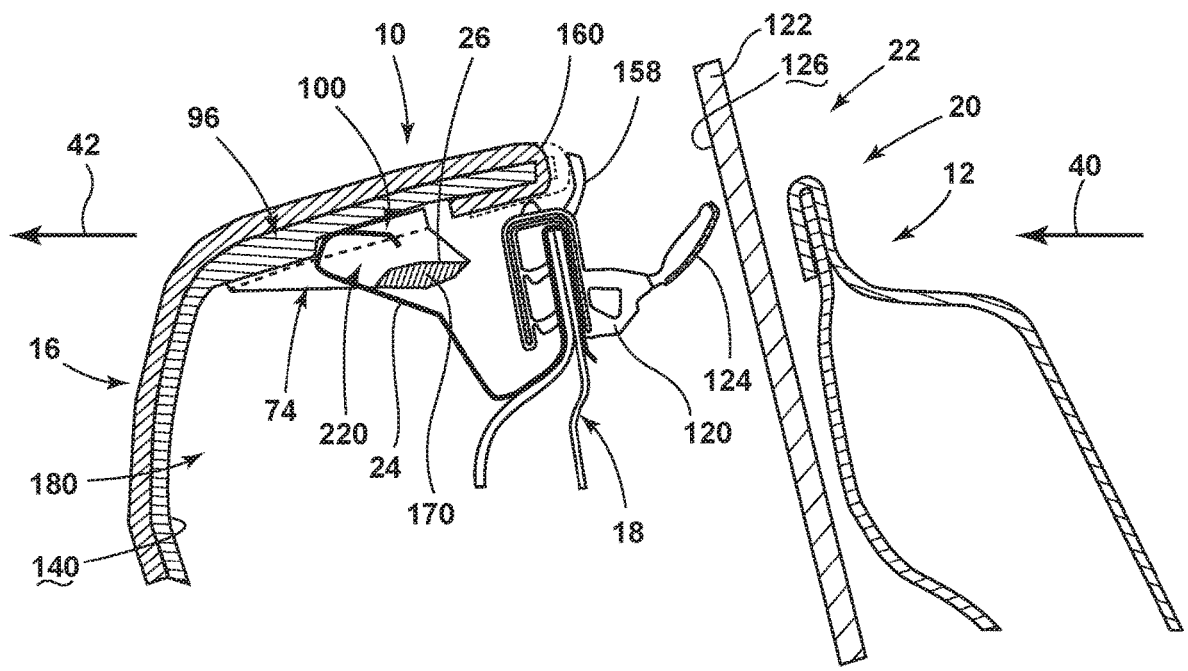
FIG. 6 is a cross-sectional view of the deflection interlock of FIG. 4 and showing the deflection interlock moving toward an impact state.
Figure 7:
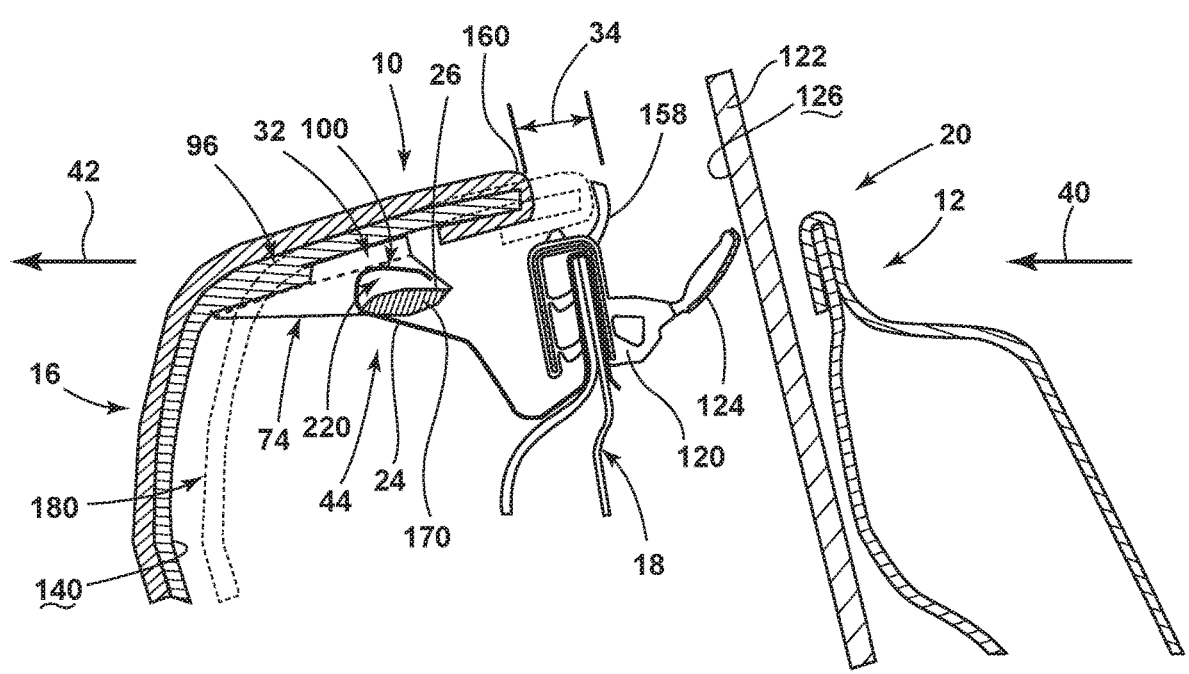
FIG. 7 is a cross-sectional view of the deflection interlock of FIG. 6 and showing the deflection interlock in the impact state.

As exemplified in FIGS. 1-3, reference numeral 10 generally refers to a deflection interlock that is disposed within a body panel 12 for a vehicle 14, where the deflection interlock 10 prevents separation of an inner trim panel 16 from an inner frame panel 18 during an impact condition 20. In an exemplary embodiment discussed herein, the inner trim panel 16 is part of a door 22 for a vehicle 14, where the inner trim panel 16 is coupled to an inner frame panel 18 of the door 22. According to various aspects of the device, the door 22 for the vehicle 14 can include a deflection interlock 10 having a first interlock 24 that is coupled to the inner frame panel 18. A second interlock 26 of the deflection interlock 10 is coupled to the inner trim panel 16. The first and second interlocks 24, 26 in a ready state 28 are separated from one another. Typically, in the ready state 28, the first interlock 24 extends above the second interlock 26 and a spacing distance 30 is defined therebetween. During an impact condition 20 of the vehicle 14, the first and second interlocks 24, 26 selectively engage one another to define an impact state 32. This impact state 32 is characterized by the deflection interlock 10 resisting deflection of the inner trim panel 16 away from the inner frame panel 18. The impact state 32 is further defined by a controlled deflection of the inner trim panel 16 away from the inner frame panel 18. Typically, a deflection distance 34 of the controlled deflection is substantially similar to the spacing distance 30 defined between the first and second interlocks 24, 26 when in the ready state 28.

As exemplified in FIGS. 2-7, during an impact condition 20, external impact forces 40 may be exerted upon the door 22 of the vehicle 14. These impact forces 40 can result in the inner trim panel 16 deflecting away from the inner frame panel 18. During this inward deflection 42 of the inner frame panel 18, the second interlock 26, being positioned below a portion of the first interlock 24, links with the first interlock 24 to define an engaged state 44 of the deflection interlock 10. The first interlock 24 that is attached to the inner frame panel 18 is allowed to at least partially deflect inward and absorb at least a portion of the external impact forces 40 as a result of the impact condition 20. The engaged state 44 of the first and second interlocks 24, 26 serves to retain the inner trim panel 16 within a specified distance away from the inner frame panel 18. Through the use of the deflection interlock 10, inward deflection 42 of the inner trim panel 16 can be substantially limited to the predetermined deflection distance 34 afforded through the configuration of the deflection interlock 10. Additionally, inward deflection 42 of the inner trim panel 16 is controlled by the deflection interlock 10. During the impact condition 20, the deflection interlock 10 may deflect while in the engaged state 44. In the engaged state 44, the deflection interlock 10 moves to the impact state 32 of the deflection interlock 10. Through this movement, the deflection interlock 10 can at least partially absorb external impact forces 40 caused by the impact condition 20. The deflection interlock 10, in this manner, absorbs at least a portion of these external impact forces 40 and limits the magnitude of these impact forces 40 that are transferred into the passenger cabin 46 and potentially toward an occupant of the vehicle 14.

Referring again to FIGS. 1-3, the inner trim panel 16 can be installed and attached to the inner frame panel 18 through a vertical edge 60 of the door 22. In such an embodiment, during manufacture of the door 22, the inner trim panel 16 is engaged at one of the vertical edges 60 of the door 22. The inner trim panel 16 is then rotated relative to the inner frame panel 18 and is attached to the inner frame panel 18 during installation. During this rotation of the inner frame panel 18 about the vertical edge 60, the second interlock 26 passes over the first interlock 24 to define the ready state 28 of the deflection interlock 10. Various angled surfaces of the first and second interlocks 24, 26 can serve as biasing surfaces that allow the first and second interlocks 24, 26 to engage one another during installation, bias away from one another and deflect back to the ready state 28 after installation of the inner trim panel 16.

According to various aspects of the device, the second interlock 26 can include a locking member 70 that is received within the first interlock 24 in the impact state 32. In this manner, the first and second interlocks 24, 26 can be elongated members having cooperative mating structures 74 located at respective ends 72 of the first and second interlocks 24, 26. These cooperative mating structures 74 can be in the form of opposing hooks, a hook and a bar that interlock with one another, interlocking clasps, mating protrusions, cooperative recesses and protrusions, combinations thereof, and other similar mating structures 74 that can be used to define the engaged state 44 of the deflection interlock 10 during an impact condition 20.

As exemplified in FIGS. 2 and 3, the cooperative mating structures 74 of the deflection interlock 10 can be in the form of elongated flanges 80 that are substantially parallel with an upper edge 82 of the inner frame panel 18. As discussed previously, the first interlock 24 connected to the inner frame panel 18 can be positioned at least partially above the second interlock 26 that is coupled to the inner trim panel 16. Through this configuration, as the inner trim panel 16 experiences the inward deflection 42 during an impact condition 20, the cooperative mating structures 74 of the first and second interlocks 24, 26 are aligned to engage one another to be moved from the ready state 28, to the engaged state 44 and to ultimately define the impact state 32 of the deflection interlock 10.

Referring now to FIGS. 1 and 4-7, the deflection interlock 10 can also be incorporated within a door 22 where the inner trim panel 16 is attached to the inner frame panel 18 along a bottom edge 90 of the vehicle door 22. During installation, the inner trim panel 16 is attached to the inner frame panel 18 along a bottom edge 90 of the door 22. The inner trim panel 16 is then rotated about this horizontal axis 92 so that a top edge 94 of the door 22 can be defined by an engagement between the inner trim panel 16 and the inner frame panel 18. In such an embodiment, the inner trim panel 16 can include various biasing members 96 that serve to bias the first deflection interlock 10 into the ready state 28. In this ready state 28, the first interlock 24 can define a pretensioned position 98 of the first interlock 24. Through the use of the biasing member 96 of the inner trim panel 16, the first interlock 24 is pre-tensioned while in the ready state 28 and the first interlock 24 is biased toward a catching state 100. Accordingly, during the occurrence of an impact condition 20, the first interlock 24 can become separated from the biasing member 96. In this manner, the first interlock 24 is biased into the catching state 100 where the first interlock 24 is in a position to receive the second interlock 26 to define the engaged state 44 of the deflection interlock 10. As discussed above, in the engaged state 44 of the deflection interlock 10, the deflection interlock 10 at least partially deflects as the inner trim panel 16 moves and experiences the inward deflection 42 to define the impact state 32. The deflection interlock 10 also limits the inward deflection 42 of the inner trim panel 16 to be defined within the predetermined deflection distance 34 away from the inner frame panel 18.

Figures 8, 8A:
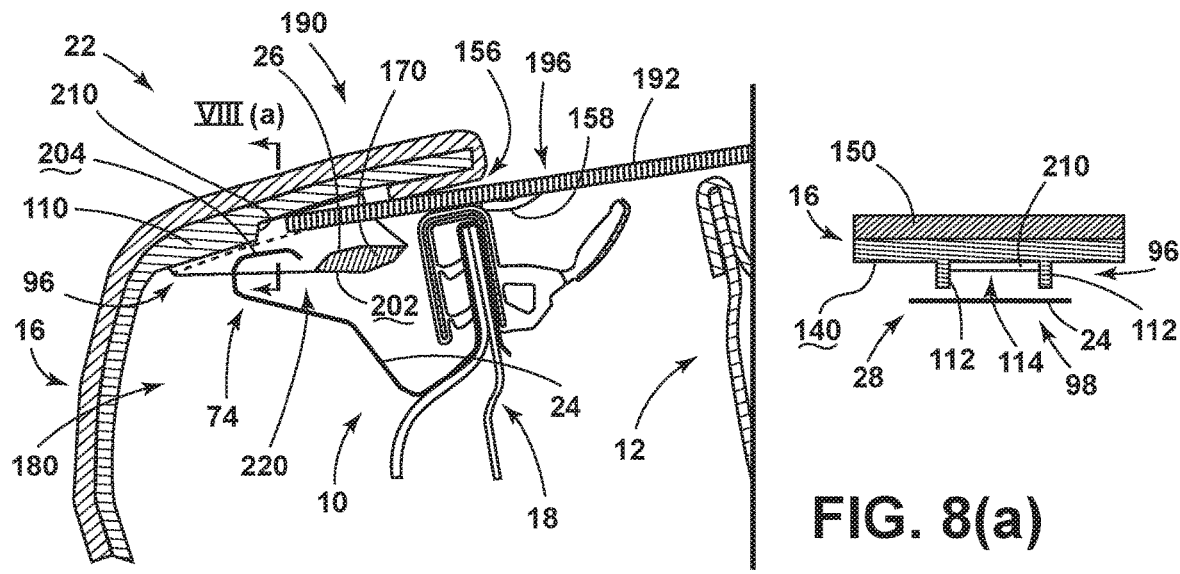
FIG. 8 is a cross-sectional view of the deflection interlock of FIG. 4 and exemplifying a first step of a maintenance process for separating the deflection interlock for maintenance within the door of the vehicle.
FIG. 8(a) is a cross-sectional view of the deflection interlock of FIG. 8 taken along line VII(a)-VII(a)
Figures 9, 9A:
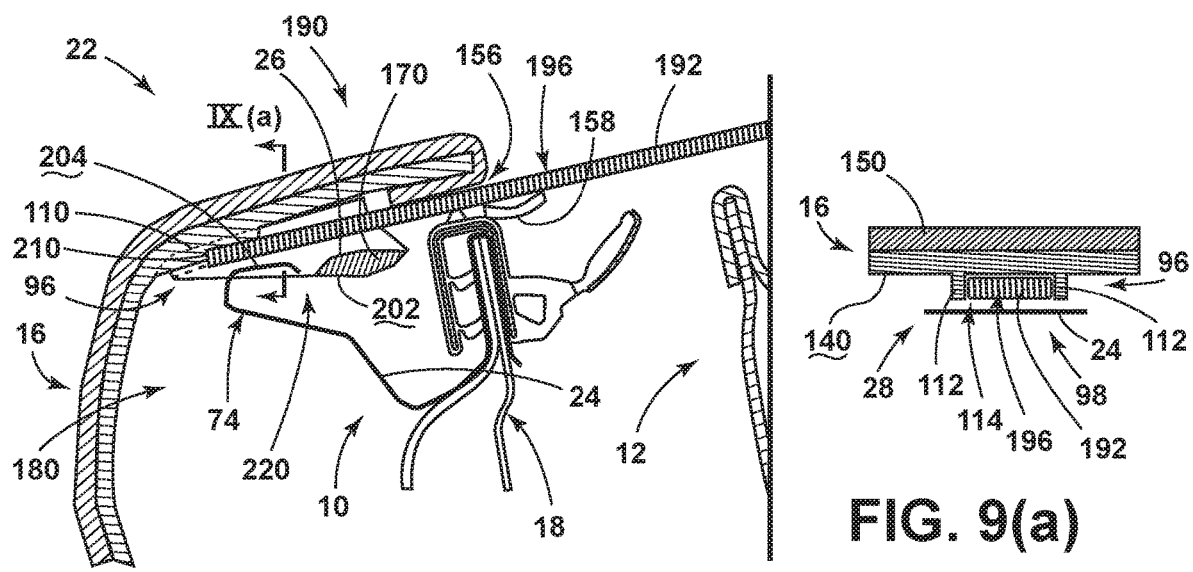
FIG. 9 is a cross-sectional view of the deflection interlock of FIG. 8 showing a subsequent step of the maintenance process.
FIG. 9(a) is a cross-sectional view of the deflection interlock of FIG. 9, taken along line IX(a)-IX(a)
Figure 10:
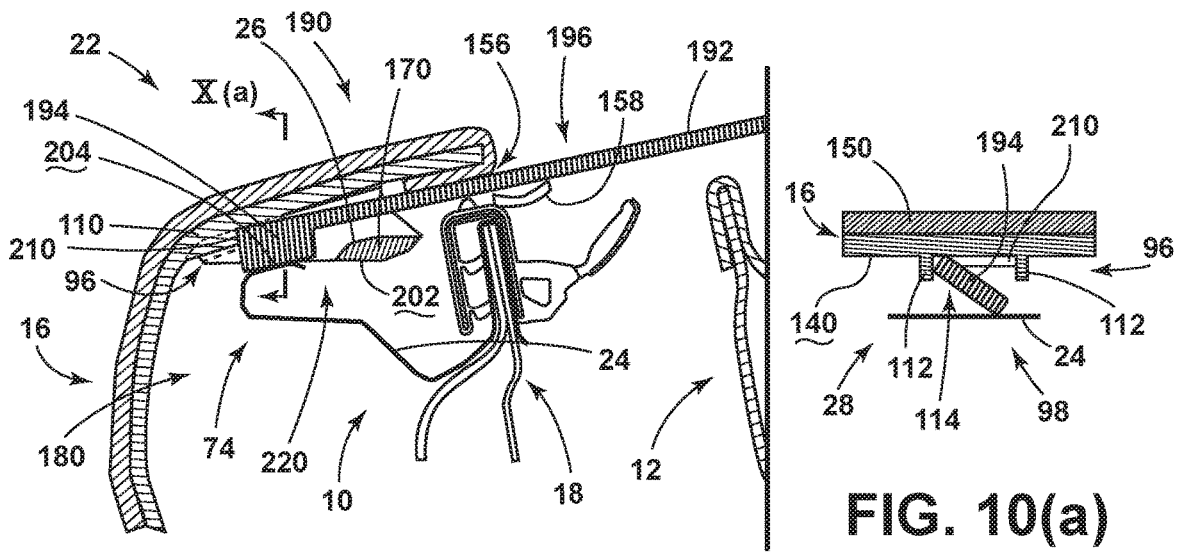
FIG. 10 is a cross-sectional view of the deflection interlock of FIG. 9 showing a next step in the maintenance process.
Figure 11:
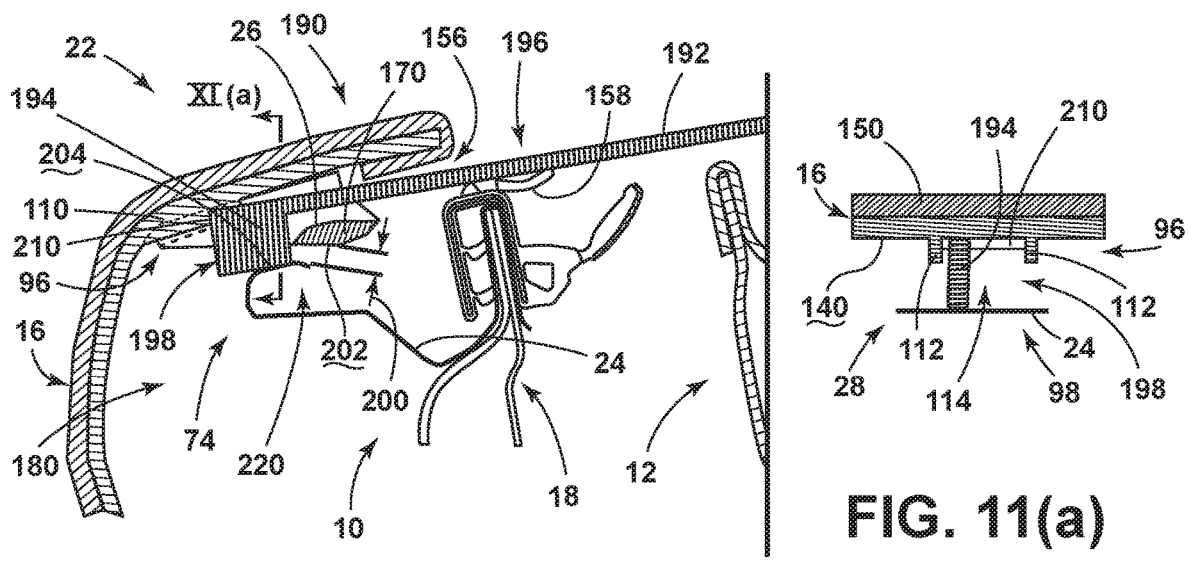
FIG. 11 is a cross-sectional view of the deflection interlock of FIG. 10 showing a next step in the maintenance process.
Figure 14:
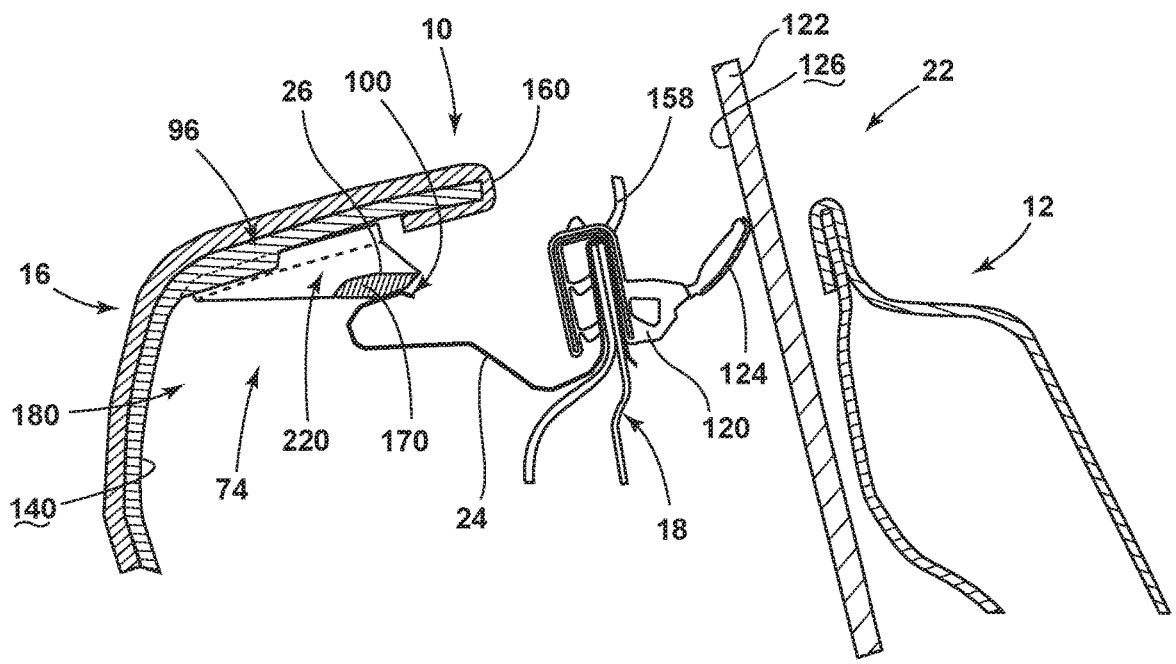
FIG. 14 is a cross-sectional view of the deflection interlock of FIG. 13 showing a next step in the installation process.
Figure 15:
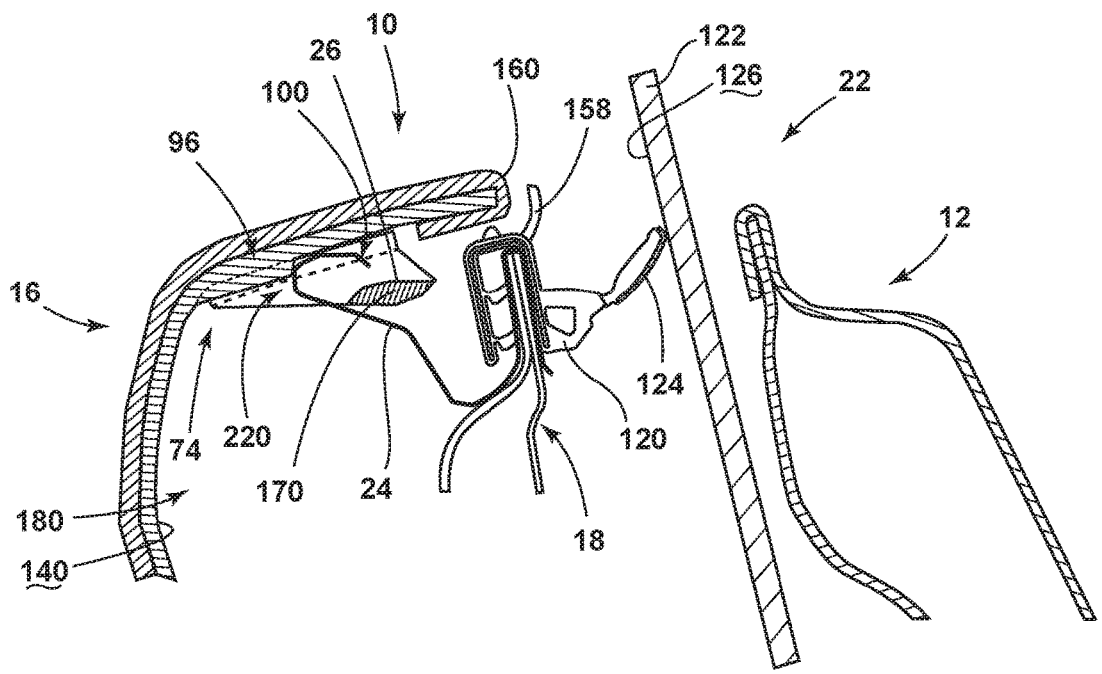
FIG. 15 is a cross-sectional view of the deflection interlock of FIG. 14 showing a next step in the installation process.
Figure 16:
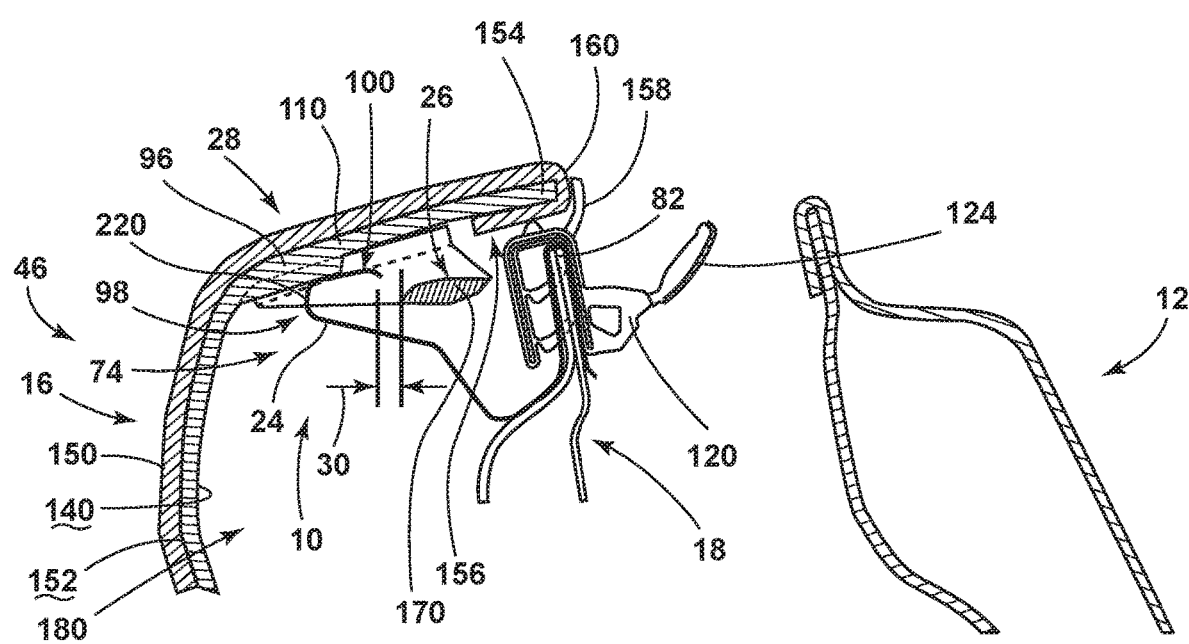
FIG. 16 is a cross-sectional view of the deflection interlock of FIG. 15 showing the deflection interlock in a ready state.

According to various aspects of the device, as exemplified in FIGS. 4-7, the biasing member 96 of the inner trim panel 16 can include a plurality of ribs 110. In such an embodiment, adjacent ribs 112 of the plurality of ribs 110 can define a maintenance access space 114 (shown in FIG. 8(*a*)) of the first and second interlocks 24, 26. The need for this maintenance access space 114 will be described more fully below.

According to various aspects of the device, the first interlock 24 that is coupled to the inner frame panel 18 can be positioned over the upper edge 82 of the inner frame panel 18. Additionally, a beltline seal 120 for the door 22 can be positioned over the first interlock 24. This beltline seal 120 is typically used for defining a seal between the inner trim panel 16, the inner frame panel 18 and an operable window 122 that is vertically operable within the door 22. The beltline seal 120 includes a sealing member 124 that is biased against the inside surface 126 of the operable window 122.

As exemplified in various aspects of the device as illustrated in FIGS. 2-7, the deflection interlock 10 can be utilized in various portions of the vehicle 14. Such portions can include, but are not limited to, vehicle doors 22, interior trim panels, dashboard panels 130, and other similar settings where inward deflection 42 of the inner trim panel 16 into the passenger cabin 46 can result during an impact condition 20.

According to various aspects of the device, as exemplified in FIGS. 1-7, the second interlock 26 attached to the inner trim panel 16 can be a separate member that is fixed to a cavity-side surface 140 of the inner trim panel 16. Alternatively, the second interlock 26 can be an integrally formed member that is part of the inner trim panel 16 at or near the cavity-side surface 140.

Referring again to FIGS. 2-7, the inner trim panel 16 can be a rigid member that has a covering 150 that extends around an outer surface 152 of the inner trim panel 16. This covering 150 can extend around outer edges 154 of the inner trim panel 16 and can also extend at least partially around portions of the second interlock 26 of the deflection interlock 10. Additionally, a portion of the second interlock 26 for the inner trim panel 16 can extend in a generally downward direction for concealing portions of the beltline seal 120 and the gap 156 that may exist between the inner trim panel 16 and the inner frame panel 18 in the ready state 28. In alternative aspects of the device, a trim seal 158 can extend between the beltline seal 120 and an inner edge 160 of the inner trim panel 16 for concealing this gap 156 between the inner trim panel 16 and the beltline seal 120.

Referring again to FIGS. 2-7, the impact state 32 of the deflection interlock 10 can be defined by the second interlock 26 moving the deflection distance 34 relative to the inner trim panel 16. As discussed above, this deflection distance 34 can be substantially similar to the spacing distance 30 that is defined between the first and second interlocks 24, 26 while in the ready state 28. The deflection distance 34 may also be different from, and typically greater than, the spacing distance 30.

Referring again to FIGS. 4-7, where the inner trim panel 16 includes the biasing member 96, the occurrence of an impact condition 20 can result in the second interlock 26 being removed from the biasing member 96, so that the first interlock 24 can be moved into the catching state 100 for receiving the second interlock 26. In various aspects of the device, a second interlock 26 that is attached to the inner trim panel 16 includes a locking member 70 that is received within the first interlock 24 in the impact state 32. This locking member 70 can be in the form of an interlock bar 170 that extends substantially parallel to the remainder of the inner trim panel 16. This interlock bar 170 can be in the form of the cooperative mating structure 74 for the second interlock 26 that is offset from the inner or cavity-side surface 140 of the inner trim panel 16.

Referring again to FIGS. 2-7, the door 22 for the vehicle 14 can include the inner trim and inner frame panels 16, 18 that define a door cavity 180 therebetween. The deflection interlock 10 is disposed within the door cavity 180 and is selectively operated from a ready state 28 to an impact state 32 during an impact condition 20. As discussed previously, the impact state 32 of the deflection interlock 10 is defined by the deflection interlock 10 securing the inner frame panel 18 to the inner trim panel 16 at a predetermined deflection distance 34 in response to an impact condition 20. The ready state 28 of the deflection interlock 10 is defined by the first and second interlocks 24, 26 being separated by the predetermined spacing distance 30. The impact state 32 is further defined by the first and second interlocks 24, 26 being engaged together to define an engaged state 44 of the deflection interlock 10. In this engaged state 44, the deflection interlock 10 is afforded some additional deflection so that the deflection interlock 10 in the engaged state 44 moves through a generally inward deflection 42 to absorb at least a portion of the impact forces 40 exerted upon the vehicle 14 during an impact condition 20. As discussed previously, the movement of the deflection interlock 10 in the engaged state 44 allows for an absorption of these impact forces 40 so that these impact forces 40 are not substantially transferred to the passenger cabin 46 and potentially to an occupant of the passenger cabin 46.

As exemplified in FIGS. 2-7, the first interlock 24 is positioned between a beltline seal 120 and the inner frame panel 18. The first deflection interlock 10 typically extends toward the inner trim panel 16 to define the spacing distance 30 that is between the first and second interlocks 24, 26.

As exemplified in FIGS. 4-7, the first interlock 24 is pre-tensioned while in the ready state 28. The first interlock 24 is also biased in the direction of the catching state 100. Accordingly, during an impact condition 20, the first interlock 24 slides away from the biasing member 96 and is biased toward the catching state 100 to receive the second interlock 26 during the impact condition 20. The inner trim panel 16 typically includes the biasing member 96 that biases the first interlock 24 into the ready state 28 and also defines the pre-tensioned position 98 of the first interlock 24.

Referring again to FIGS. 2-7, a vehicle 14 having the deflection interlock 10 can include the door 22 that includes the inner frame panel 18 and the inner trim panel 16. The deflection interlock 10 extends between the inner frame panel 18 and the inner trim panel 16. The deflection interlock 10 is selectively operable from a disconnected ready state 28 to a connected or engaged impact state 32. As discussed above, the impact state 32 of the deflection interlock 10 is at least partially characterized by an engaged state 44 of the first and second interlocks 24, 26. The connected impact state 32 is further defined by the deflection interlock 10 securing the inner frame panel 18 to the inner trim panel 16 at a predetermined deflection distance 34 in response to an impact condition 20.

Referring now to FIGS. 9-12(a), a maintenance process 190 is disclosed for separating the deflection interlock 10 for removing the inner trim panel 16 from the inner frame panel 18. As discussed previously, where the inner trim panel 16 includes a plurality of ribs 110 that form the biasing member 96, adjacent ribs 112 of a plurality of ribs 110 can define the maintenance access space 114 of the deflection interlock 10. A separation tool 192 can be disposed proximate the beltline seal 120 and the trim seal 158 and between the beltline seal 120 and the inner trim panel 16. As exemplified in FIGS. 8 and 8(a), the separation tool 192 fits between adjacent ribs 112 and above a top surface 204 of the interlock bar 170. The separation tool 192 can then be rotated approximately 90° while between the adjacent ribs 112 that form the maintenance space. Rotation of the separation tool 192 is exemplified as a progression in FIGS. 10-12(a). Through this rotation of the separation tool 192, an enlarged end 194 of the separation tool 192 is rotated from an insertion state 196 to a removal state 198. Rotation of the separation tool 192 biases the inner trim panel 16 against the first interlock 24 of the inner frame panel 18. Through this rotation of the separation tool 192, the enlarged end 194 can rotate in an area between the second interlock 26 and the cavity-side surface 140 of the inner trim panel 16 and bias the first interlock 24 to a position below the second interlock 26. Once the first interlock 24 is fully rotated by the separation tool 192 in the removal state 198, the separation tool 192 can be used to push the inner trim panel 16 away from the inner frame panel 18. When the separation tool 192 is in the removal state 198, a clearance space 200 is defined between the bottom surface 202 of the second interlock 26 and the top surface 204 of the first interlock 24. Using this clearance space 200, the inner trim panel 16 is rotated away from the inner frame panel 18 and the first and second interlocks 24, 26 are separated from one another to allow for access into the door cavity 180 for maintenance. The separation tool 192 can be in the form of a uniquely designed tool that fits within the maintenance space and can be rotated between the insertion and removal states 196, 198. The separation tool 192 can also be in the form of a screwdriver or other known tool that can be rotated to bias the first interlock 24 away from the second interlock 26 to form the clearance space 200 between the first and second interlocks 24, 26.

Referring again to FIGS. 8-12(a), the plurality of ribs 110 can include an abutment surface 210 that can receive the enlarged end 194 of the separation tool 192. This abutment surface 210 can receive the separation tool 192 so that the separation tool 192 can be pushed against the abutment surface 210 to push the inner trim panel 16 away from the inner frame panel 18 after the separation tool 192 has been rotated to the removal state 198.

Referring again to FIGS. 4-7, the first interlock 24 can include an end 72 having a receiving channel 220. This receiving channel 220 can be biased in the ready state 28 through the use of the biasing member 96 in the form of the plurality of ribs 110 of the inner trim panel 16. The receiving channel 220, during the impact state 32, is moved to the catching state 100 to receive the second interlock 26. In such an embodiment, the second interlock 26 is typically in the form of a retaining or interlock bar 170 that can be moved into the receiving channel 220 of the first interlock 24. Through this configuration, the engaged state 44 of the deflection interlock 10 can be defined for completing the impact state 32 and absorbing at least a portion of the impact forces 40 exerted upon the vehicle 14 during an impact condition 20.

Referring now to FIGS. 1-17, having described various aspects of the deflection interlock 10, a method 400 is disclosed for connecting an inner trim panel 16 to an inner frame panel 18 to define the deflection interlock 10. According to the method 400, the inner frame panel 18 is attached at a bottom edge 90 of the inner frame panel 18 (step 402). The inner frame panel 18 is then rotated upward so that the first and second interlocks 24, 26 of the deflection interlock 10 can engage one another (step 404). As the second interlock 26 engages the first interlock 24, the second interlock 26 biases the first interlock 24 in a generally downward direction to form a clearance space 200 to allow for passage of the second interlock 26 past the first interlock 24 (step 406). After the second interlock 26 bypasses the first interlock 24, the first interlock 24 is biased into the catching state 100 (step 408). As discussed previously, the catching state 100 is defined by the first interlock 24 being removed from the biasing member 96 of the inner trim panel 16. The inner trim panel 16 is then moved into the installed condition relative to the inner frame panel 18. In this installed condition, the first interlock 24 is biased to the ready state 28 by the biasing member 96. In this manner, movement of the inner trim panel 16 relative to the inner frame panel 18 causes a sliding operation between the inner trim panel 16 and the first interlock 24. This sliding operation serves to engage the biasing member 96 of the inner trim panel 16 with the first interlock 24. The biasing member 96, in this fashion, moves the first interlock 24 to the ready state 28 and pretensions the first interlock 24. In this pre-tensioned position 98, the first interlock 24 is continually biased toward the catching state 100 to receive the second interlock 26 during an impact condition 20. By biasing the first interlock 24 toward the catching state 100, the first interlock 24 is tended in this direction and the external impact forces 40 are less likely to move the first interlock 24 away from the catching state 100.

According to various aspects of the device, the deflection interlock 10 can be utilized within various vehicles and various vehicle settings. These vehicle settings can include attachments between inner trim panels 16 and frame members for the vehicle 14. Through the use of the deflection interlock 10, separation of the inner trim panel 16 from the frame for the vehicle 14 can be controlled. Additionally, this separation of the inner trim panel 16 from the frame for the vehicle 14 can also serve to absorb at least a portion of the impact forces 40 exerted upon the vehicle 14 during an impact condition 20. By absorbing these forces through the controlled deflection of the inner trim panel 16, external forces exerted upon the vehicle 14 can be absorbed so that these forces do not transfer into the passenger cabin 46 and potentially into an occupant of the vehicle 14.

In the various aspects of the device that include use of the separation tool 192, a single separation tool 192 can be used for removing the inner trim panel 16 from the inner frame panel 18 during the maintenance process 190. It is also contemplated that two or more separation tools 192 can be simultaneously used for detaching the first and second interlocks 24, 26 at various points along the engagement between the inner trim panel 16 and the inner frame panel 18. In such an embodiment, once each of the separation tools 192 are in the removal state 198, the inner trim panel 16 can be conveniently separated from the inner frame panel 18 and rotated about a bottom edge 90 of the vehicle door 22.

In various aspects of the device, the deflection interlock 10 can be made of various materials. These materials, which are typically rigid, can include, but are not limited to, metal, plastic, composite, various polymers, combinations thereof, and other similar materials. In various aspects of the device, the first interlock 24 can be made of a different material than that of the second interlock 26. These materials can be dictated by the form and shape of the various interlocks of the deflection interlock 10. By way of example, and not limitation, the deflection interlock 10 exemplified in FIGS. 4-7 includes an at least partially elastic first interlock 24 that can be moved to a pre-tensioned position 98 by the biasing members 96. Such an interlock may typically be in the form of a metal first interlock 24. Conversely, the second interlock 26 can be a plastic and/or metal member that is substantially rigid where only very minimal deflection of the second interlock 26 would typically be contemplated. The configuration of the materials for the deflection interlock 10 typically allows for a predetermined amount of deflection through the deflection distance 34 while the deflection interlock 10 is in the engaged state 44. Again, the movement of the deflection interlock 10 in the engaged state 44 serves to absorb at least a portion of the impact forces 40 exerted upon the vehicle 14 during an impact condition 20.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle door comprising:
   a first interlock coupled to an inner frame panel; and
   a second interlock coupled to an inner trim panel, the first and second interlocks defining a ready state that prevents lateral separation of the inner frame panel and the inner trim panel; wherein,
   the first and second interlocks are positioned in the ready state to define a maintenance gap between the first and second interlocks;
   the inner frame and the inner trim panel are selectively and vertically separable to define a maintenance state by expanding the maintenance gap between the first and second interlocks; and
   the first and second interlocks in the maintenance state are positioned to laterally bypass one another to allow for selective and lateral separation of the inner frame panel and the inner trim panel.

2. The vehicle door of claim 1, wherein a separation tool selectively engages the first and second interlocks in the ready state and within the maintenance gap, and wherein operation of the separation tool operates the first and second interlocks between the ready state and the maintenance state.

3. The vehicle door of claim 2, wherein a trim seal extends over the maintenance gap in the ready state, where the trim seal is operable to provide access to the maintenance gap.

4. The vehicle door of claim 1, wherein the first interlock is positioned between a beltline seal and the inner frame panel, and wherein the first interlock extends toward the inner trim panel.

5. The vehicle door of claim 4, wherein the first interlock is pre-tensioned in the ready state, wherein the first interlock is biased toward a direction of an impact state, the impact state defined by selective engagement between the first and second interlocks to resist deflection of the inner trim panel away from the inner frame panel.

6. The vehicle door of claim 5, wherein the inner trim panel includes a biasing member that biases the first interlock into the ready state and defines a pre-tensioned position of the first interlock.

7. The vehicle door of claim 1, wherein the second interlock includes a locking member that extends partially around the first interlock in the ready state.

8. The vehicle door of claim 6, wherein the biasing member of the inner trim panel includes a plurality of ribs, wherein adjacent ribs of the plurality of ribs define the maintenance gap of the first and second interlocks.

9. The vehicle door of claim 1, wherein the first and second interlocks are elongated members having cooperative mating structures at respective ends of the first and second interlocks.

10. The vehicle door of claim 9, wherein the cooperative mating structure of the second interlock is offset from an inner surface of the inner trim panel.

11. The vehicle door of claim 9, wherein the cooperative mating structures are elongated flanges that are substantially parallel with an upper edge of the inner frame panel.

12. A vehicle door comprising:
inner trim and inner frame panels that define a door cavity therebetween; and
a deflection interlock disposed within the door cavity and selectively operable from a ready state that prevents lateral separation of the inner trim panel and the inner frame panel to a maintenance state that allows the inner trim panel to laterally separate from the inner frame panel, wherein,
cooperative mating structures of the deflection interlock are elongated flanges that are substantially parallel with an upper edge of the inner frame panel; and
the deflection interlock includes a maintenance gap that is selectively and vertically expandable to operate the deflection interlock and the cooperative mating structures thereof between the ready and maintenance states.

13. The vehicle door of claim 12, wherein the deflection interlock comprises:
a first interlock coupled to the inner frame panel; and
a second interlock coupled to the inner trim panel, the first and second interlocks defining the cooperative mating structures.

14. The vehicle door of claim 13, wherein the ready state is defined by the cooperative mating structures of the first and second interlocks being separated by a predetermined deflection distance, and wherein an impact state is defined by the cooperative mating structures being engaged together in an engaged state.

15. The vehicle door of claim 13, wherein a separation tool selectively engages the first and second interlocks in the ready state and within the maintenance gap, and wherein operation of the separation tool operates the first and second interlocks between the ready state and the maintenance state.

16. The vehicle door of claim 14, wherein the first interlock is positioned between a beltline seal and the inner frame panel, and wherein the first interlock extends toward the inner trim panel.

17. The vehicle door of claim 16, wherein a biasing member of the inner trim panel includes a plurality of ribs, wherein adjacent ribs of the plurality of ribs define a maintenance access space of the first and second interlocks.

18. The vehicle door of claim 17, wherein a mating structure of the second interlock is offset from an inner surface of the inner trim panel.

19. A vehicle comprising:
a door having a frame panel and an inner panel; and
a deflection interlock extending between the frame panel and the inner panel; wherein:
cooperative mating structures of the deflection interlock are elongated flanges that are separated by a maintenance gap and substantially parallel with an upper edge of the inner frame panel;
the deflection interlock is selectively operable from an aligned ready state to a misaligned maintenance state; and
the misaligned maintenance state is defined by the cooperative mating structures of the deflection interlock being in an offset position that allows the cooperative mating structures to bypass one another and allow the frame panel to be separated from the inner panel.

20. The vehicle of claim 19, wherein a separation tool selectively engages the cooperative mating structures in the aligned ready state and within the maintenance gap, and wherein operation of the separation tool operates the cooperative mating structures between the aligned ready state and the misaligned maintenance state.

* * * * *